(12) United States Patent
Chuang et al.

(10) Patent No.: US 7,978,406 B2
(45) Date of Patent: Jul. 12, 2011

(54) PROJECTION SCREEN

(75) Inventors: Fu-Ming Chuang, Hsin-chu (TW);
Ching-Shiang Li, Hsin-Chu (TW);
Chun-Chien Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 107 days.

(21) Appl. No.: 12/588,430

(22) Filed: Oct. 15, 2009

(65) Prior Publication Data
US 2010/0103513 A1  Apr. 29, 2010

(30) Foreign Application Priority Data

Oct. 24, 2008  (TW) .............................. 97140776 A

(51) Int. Cl.
*G03B 21/60* (2006.01)

(52) U.S. Cl. ....................................................... 359/459
(58) Field of Classification Search .................. 359/449, 359/459, 452–453, 455
See application file for complete search history.

(56) References Cited

U.S. PATENT DOCUMENTS

| 4,911,529 | A  | * | 3/1990  | Van De Ven ................... 359/459 |
| 5,473,469 | A  | * | 12/1995 | Magocs et al. ................. 359/449 |
| 6,842,282 | B2 |   | 1/2005  | Kuroda et al. |
| 7,262,912 | B2 |   | 8/2007  | Wood |
| 7,667,893 | B2 | * | 2/2010  | Peterson et al. .............. 359/455 |
| 7,826,135 | B2 | * | 11/2010 | Destain et al. ................. 359/449 |
| 2008/0030882 | A1 | | 2/2008 | Ichikawa et al. |

* cited by examiner

*Primary Examiner* — Christopher Mahoney
(74) *Attorney, Agent, or Firm* — Bacon & Thomas, PLLC

(57) ABSTRACT

A projection screen includes a reflection layer, a light absorbing structure, a plurality of light diffusion layers, and a lens structure. The light absorbing structure is disposed on the reflection layer and has a plurality of apertures. A part of the reflection layer is exposed via the apertures. The light diffusion layers have a first index of refraction. Each of the light diffusion layer is disposed in the corresponding aperture and contacts the corresponding reflection layer exposed via the corresponding aperture. The lens structure is disposed on the light diffusion layers and the light absorbing structure. A light incidence side of the lens structure includes a plurality of convex lenses. The convex lenses are respectively corresponding with the light diffusion layers. The lens structure has a second index of refraction, and the second index of refraction is smaller than the first index of refraction.

18 Claims, 10 Drawing Sheets

PROJECTION SCREEN

BACKGROUND OF THE INVENTION (1) Field of the Invention

The invention relates to a screen, and especially relates to a projection screen.

(2) Description of the Prior Art

Projection screen is a kind of optics screen used to diffuse projection light from a projector. When direction of the projection light and the luminous flux are fixed, the ratio between luminance of the light reflected by the projection screen and the ideal luminance acceptable by eyes is defined as a luminance coefficient in the direction of the light reflected by the projection screen. The maximum luminance coefficient is defined as the gain of the projection screen, representing the reflection capacity of the projection screen. Generally, to enhance image viewing angle, contrast, and gain, the projection screen is not only required to diffuse the projection light of the projector, but also required to eliminate interference of external light to avoid influence on the image contrast.

FIG. 1 is a schematic view of a conventional reflective front projection screen 100. Referring to FIG. 1, an opaque substrate 110 is disposed on the bottom layer of the reflective front projection screen 100. A transparent glass ball structure 120, and two transparent material layers 130 and 140 with different but similar indexes of refraction are disposed on the opaque substrate 110 orderly. A lens structure 150 composed by a plurality of lenses arranged continuously is disposed on a surface of the transparent material layer 140. One surface of the lens structure 150 is covered by a black shield layer 160.

After entering the projection screen 100 from another surface of the lens structure 150, a projection light R first passes the two transparent material layers 130 and 140 with different indexes of refraction, and then enters the glass ball structure 120. For the bottom layer of the projection screen 100 is an opaque base 110, the projection light R may be reflected or absorbed. The reflected beam may pass through the glass ball structure 120, and exit out of the projection screen 100 along an emergent light path R2 or R3. The glass ball structure 120 may diffuse the emergent light to increase the image viewing angle. Moreover, the black shield layer 160 on the lens structure 150 may absorb external miscellaneous light O to avoid the image contrast reducing by the influence of the external miscellaneous light O.

FIG. 2 is a schematic view of another conventional reflective front projection screen 200. Referring to FIG. 2, an opaque base 210 is disposed on bottom layer of the reflective front projection screen 200. A transparent glass ball structure 220, and two transparent material layers 230 and 240 with different but similar indexes of refraction are disposed on the opaque substrate 210 orderly. A surface 250 of the transparent material layer 240 is fabricated into a plane structure.

After entering the projection screen 200 from the surface 250 of the transparent material layer 240, a projection light L first passes the two transparent material layers 230 and 240 with different indexes of refraction, and then enters the glass ball structure 220. For the bottom layer of the projection screen 200 is an opaque base 210, the light beam L may be reflected or absorbed. The reflected beam passes through the glass ball structure 220, and exits out of the projection screen 200 along an emergent light path L2 or L3. The glass ball structure 220 may diffuse the emergent light to increase image viewing angle.

However, the reflective front projection screens 100 and 200 have following questions respectively:

Firstly, the lens structure 150 of the reflective front projection screen 100 in FIG. 1 uses the black shield layer 160 to absorb the external miscellaneous light O, but a part of the emergent light, such as the emergent light along the emergent light path R2, may be absorbed by the black shield layer 160, thus light emergent efficiency and the gain of the projection screen may be decreased.

Secondly, though the fabrication of the reflective front projection screen 200 in FIG. 2 is quite simple, it may not prevent the miscellaneous light O. For example, the external miscellaneous light O may enter the projection screen 200 from the emergent light path L2 or L3 to decrease the image contrast.

Thus, how to increase the image contrast and the gain of the projection screen is an urgent problem in the technology field.

SUMMARY OF THE INVENTION

Accordingly, the object of the present invention is to provide a projection screen adapted to promote the reflective effect of the projection light from the projector to increase the gain and to abate the external miscellaneous light reflected to the viewer to make the contrast of the projection image better.

In order to achieve one or part of or all the objectives, or to achieve other objectives, the embodiment of the present invention provides a projection screen including a reflection layer, a light absorbing structure, a plurality of light diffusion layers, and a lens structure. The light absorbing structure is disposed on the reflection layer and has a plurality of apertures. A part of the reflection layer are exposed via the apertures. The reflection layer is adapted to reflect a light beam and does not diffuse the light beam.

The light diffusion layers have a first index of refraction. The light diffusion layers are disposed on the same level and on the reflection layer, and each of the light diffusion layers is disposed in the corresponding aperture of the light absorbing structure. Each of the light diffusion layers contacts the corresponding reflection layer exposed via the corresponding aperture. Besides, each of the light diffusion layers has a sand blasting surface to achieve diffusion efficacy, or each of the light diffusion layers has a plurality of light diffusion particles to achieve the same. The light absorbing structure has a plurality of protruding structures disposed on the surface of the light diffusion layers.

The lens structure is disposed on the light diffusion layers and the light absorbing structure. A light incidence side of the lens structure includes a plurality of convex lenses. The convex lenses are corresponding with the light diffusion layers respectively. The lens structure has a second index of refraction, and the second index of refraction of the lens structure is smaller than the first index of refraction of the diffusion layers. Moreover, the focus of each of the convex lenses is located under the reflection layer. The convex lenses are selected from the group consisting of a sphere lens, a paraboloid lens, a polyhedron lens, and a column lens.

In order to achieve one or part of or all the objectives, or to achieve other objectives, the embodiment of the present invention provides a projection screen including a reflection layer, a light absorbing structure, a plurality of light diffusion layers, and a lens structure. The light absorbing structure includes a plurality of light absorbing layers disposed on the reflection layer and having a interval between two opposite light absorbing layers. A part of the reflection layer is exposed via the intervals. Each of the light absorbing layers may be a column with a square section or a taper section and protrudes out of the surfaces of the light diffusion layers.

A plurality of light diffusion layers are disposed on the same level and on the reflection layer, and each of the light diffusion layers is disposed in the corresponding interval and connects adjacently to the corresponding light absorbing structure.

The lens structure is disposed on the light diffusion layers and the light absorbing structure. A light incidence side of the lens structure includes a plurality of convex lenses corresponding with the light diffusion layers respectively. The lens structure has a second index of refraction, and the second index of refraction is smaller than the first index of refraction. Each of the convex lenses is disposed right on the corresponding light diffusion layer.

Comparing with the conventional reflective front projection screen, the light absorbing structure of the embodiment of the present invention may absorb the miscellaneous light effectively to improve the image contrast. The lens structure may converge the projection light from the projector to enhance the brightness. The projection light after being brightened is diffused by the light diffusion layer or reflected after entering the reflection layer to increase the brightness and the image viewing angle of the emerged light from the projection screen.

Above all, the reflective front projection screen of the embodiment of the present invention may not only increase the image contrast, enhance the gain of the projection screen, but also improve the image viewing angle. Thus, the embodiment of the present invention may enhance the visual effects of the sense of the viewer.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PRESENT EMBODIMENTS

In the following detailed description of the present embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
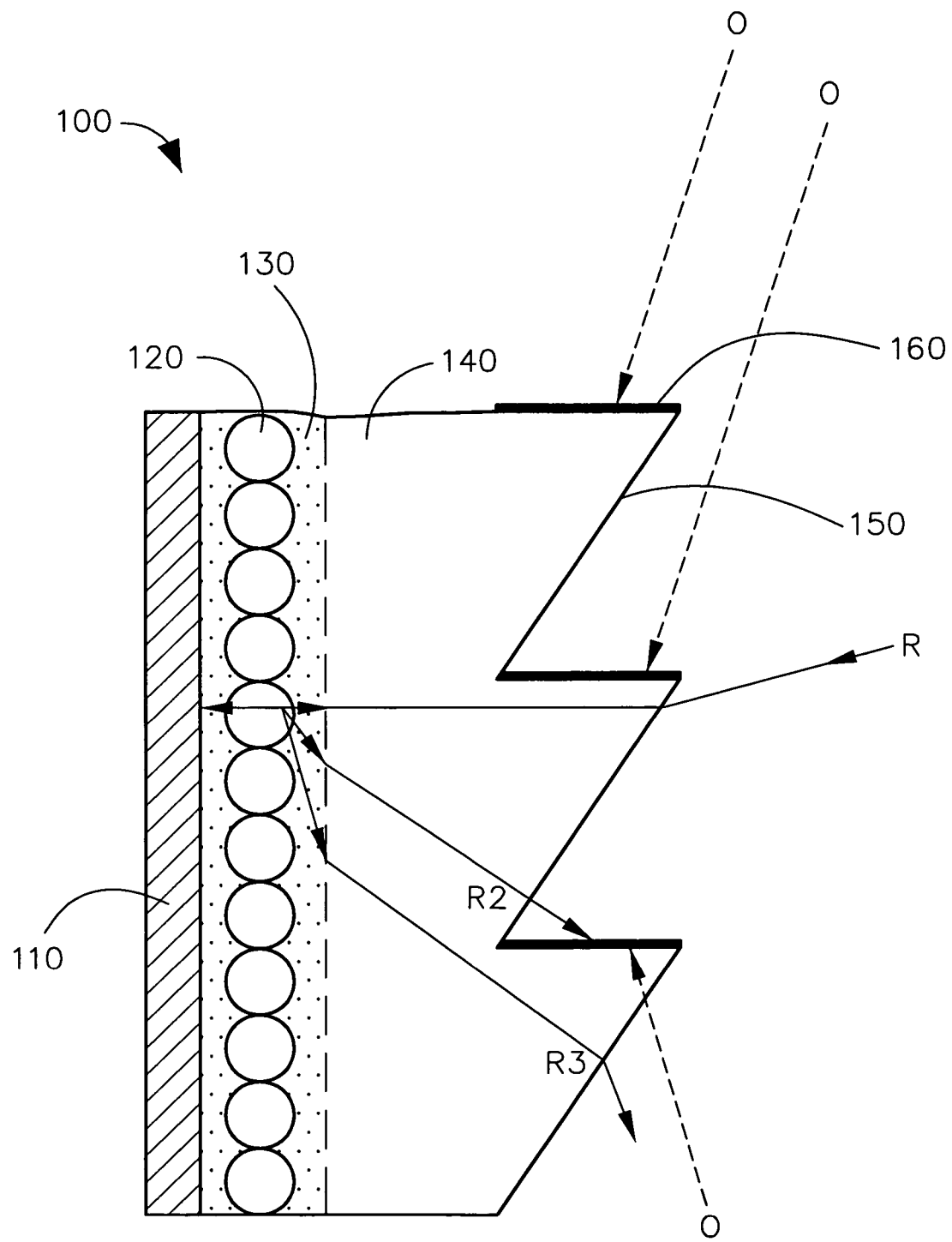
FIG. 1 is a schematic view of a conventional reflective front projection screen.
Figure 2:
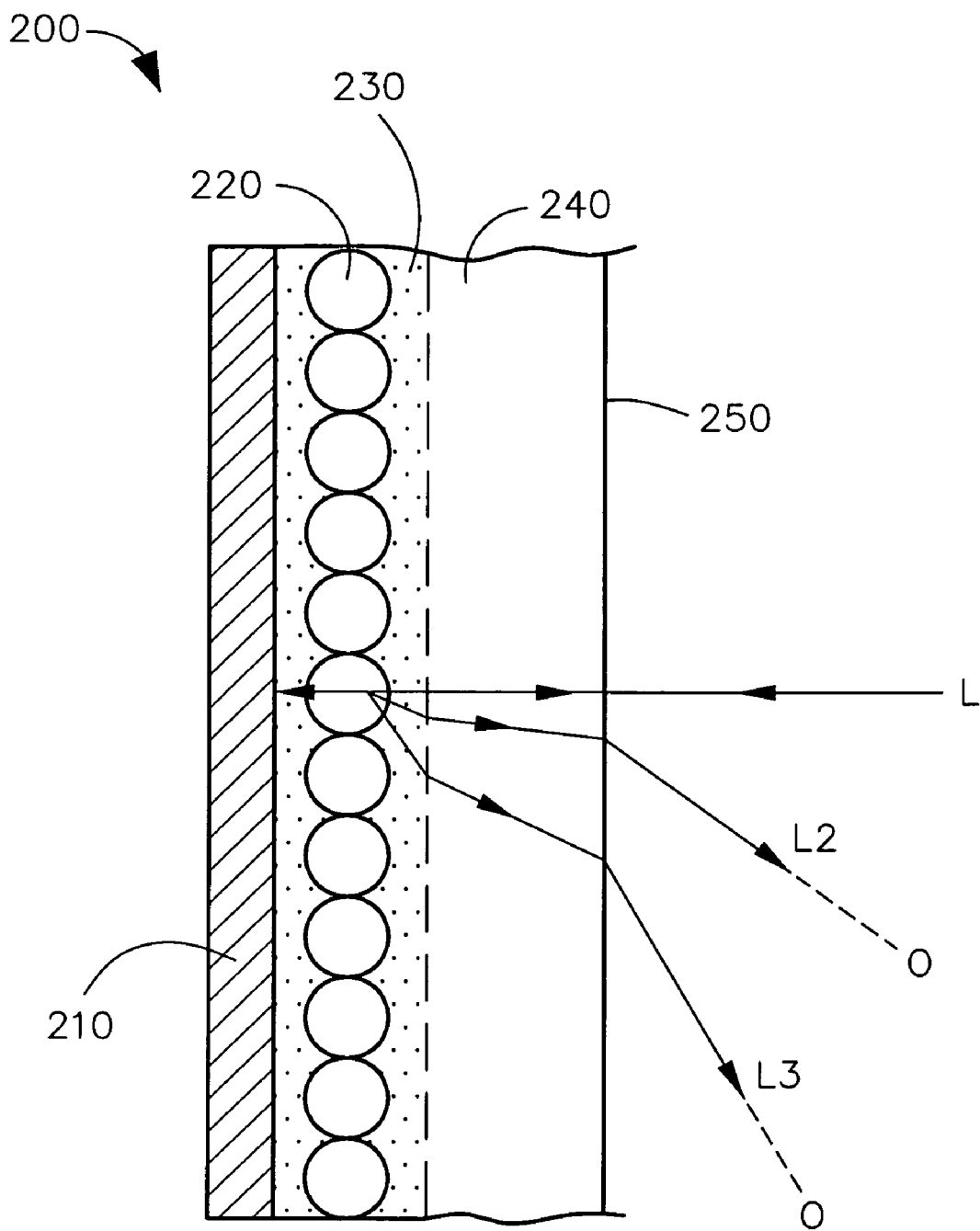
FIG. 2 is a schematic view of another conventional reflective front projection screen.
Figure 3:
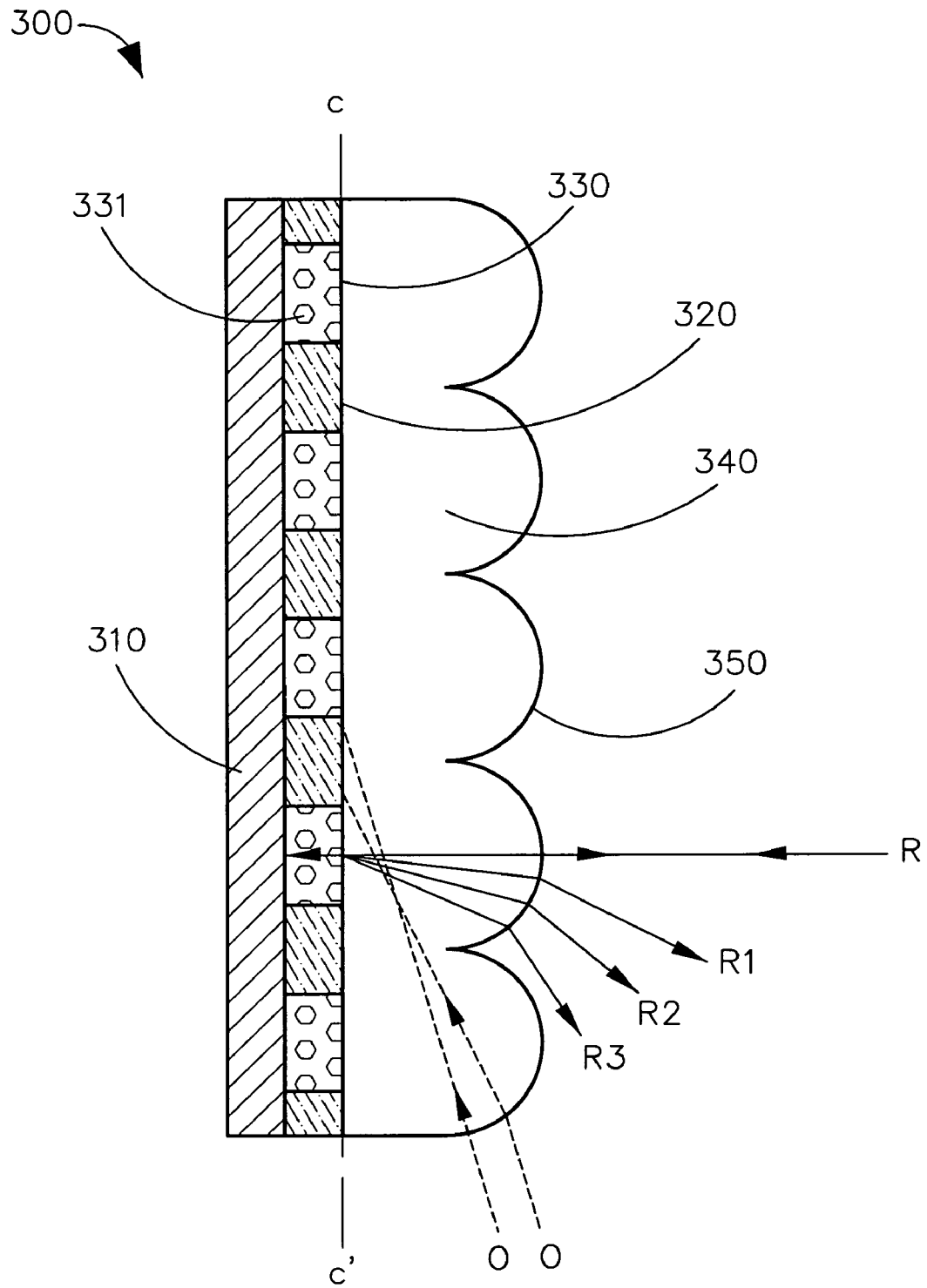
FIG. 3 is a schematic view of the first embodiment of the projection screen according to the present invention.

Referring to FIG. 3, FIG. 3 is a schematic view of the first embodiment of the projection screen 300 according to the present invention. As FIG. 3 shows, the projection screen 300 includes a reflection layer 310, a light absorbing structure 320, a plurality of light diffusion layers 330, and a lens structure 340. The light absorbing structure 320 and the light diffusion layers 330 are disposed on the reflection layer 310, and the lens structure 340 is disposed on the light absorbing structure 320 and the light diffusion layers 330. Notably, the light diffusion layers 330 are disposed on the same level and on the reflection layer 310. The light diffusion layer 330 and the lens structure 340 are both transparent. The index of refraction of the lens structure 340 is smaller than the index of refraction of the light diffusion layer 330.

Figure 3A:
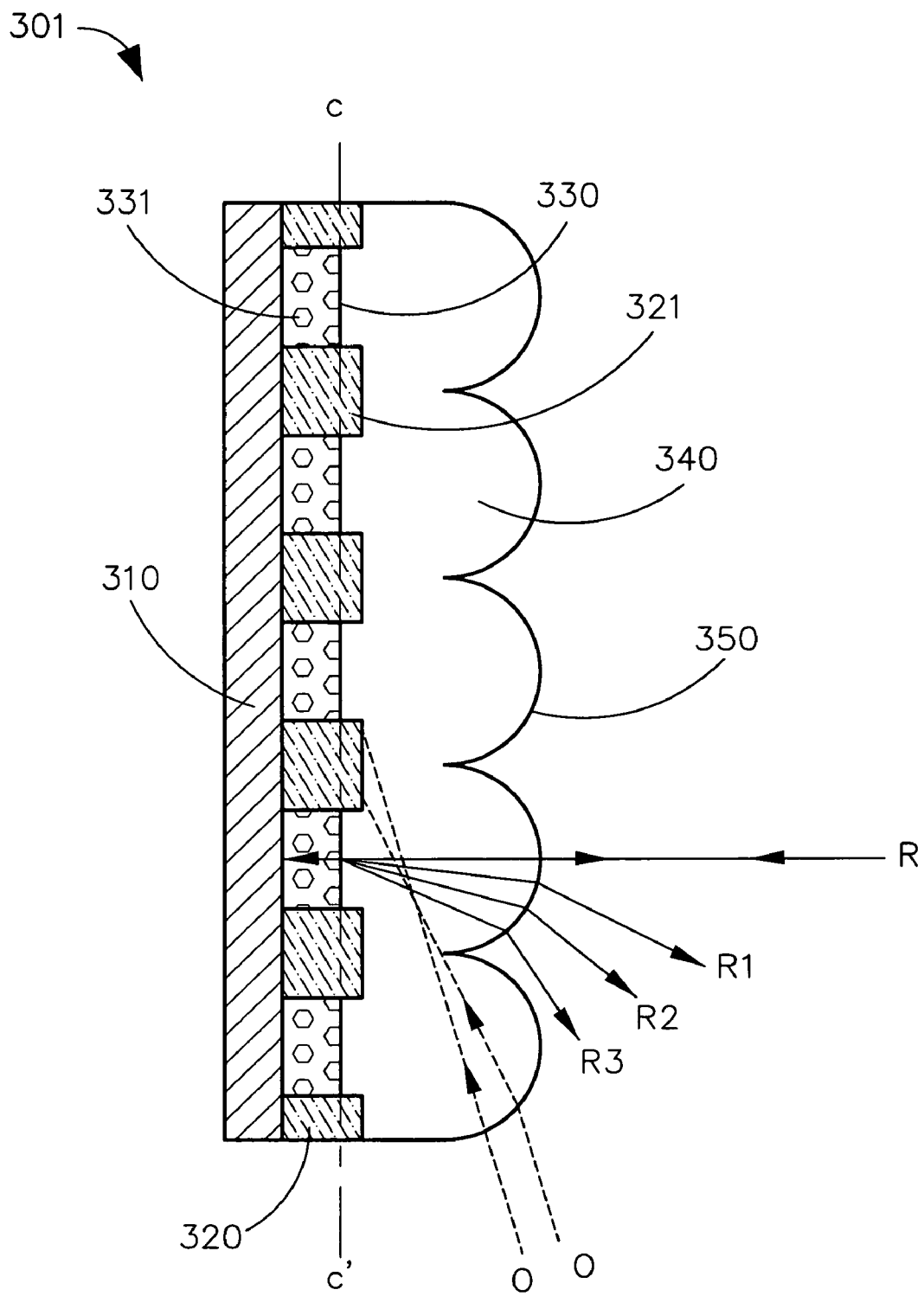
FIG. 3A is a schematic view of the second embodiment of the projection screen according to the present invention.

Moreover, the light absorbing structure 320 of the projection screen 300 may have a plurality of protruding structures disposed on the surface of the light diffusion layers 330. Refer to FIG. 3A for a schematic view showing the section of the second embodiment of the projection screen 301 according to the present invention and FIG. 3B for a schematic view showing the section of the third embodiment of the projection screen 302 according to the present invention. The protruding structures 321 and 322 of the light absorbing structure 320 of the projection screens 301 and 302 are columns with square section and taper section separately. There are apertures (not shown) formed between columns.

Figure 3B:
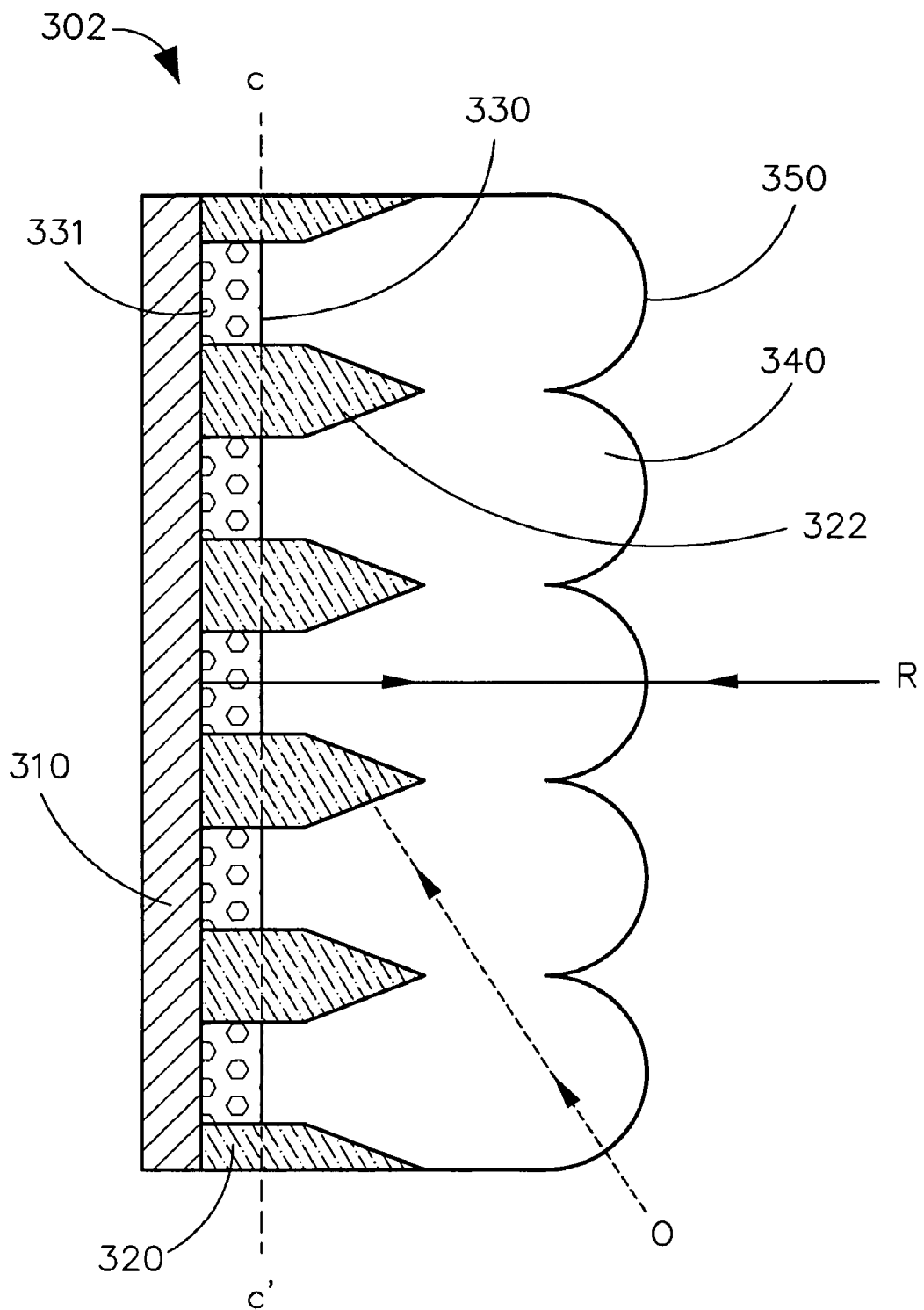
FIG. 3B is a schematic view of the third embodiment of the projection screen according to the present invention.
Figure 4A:
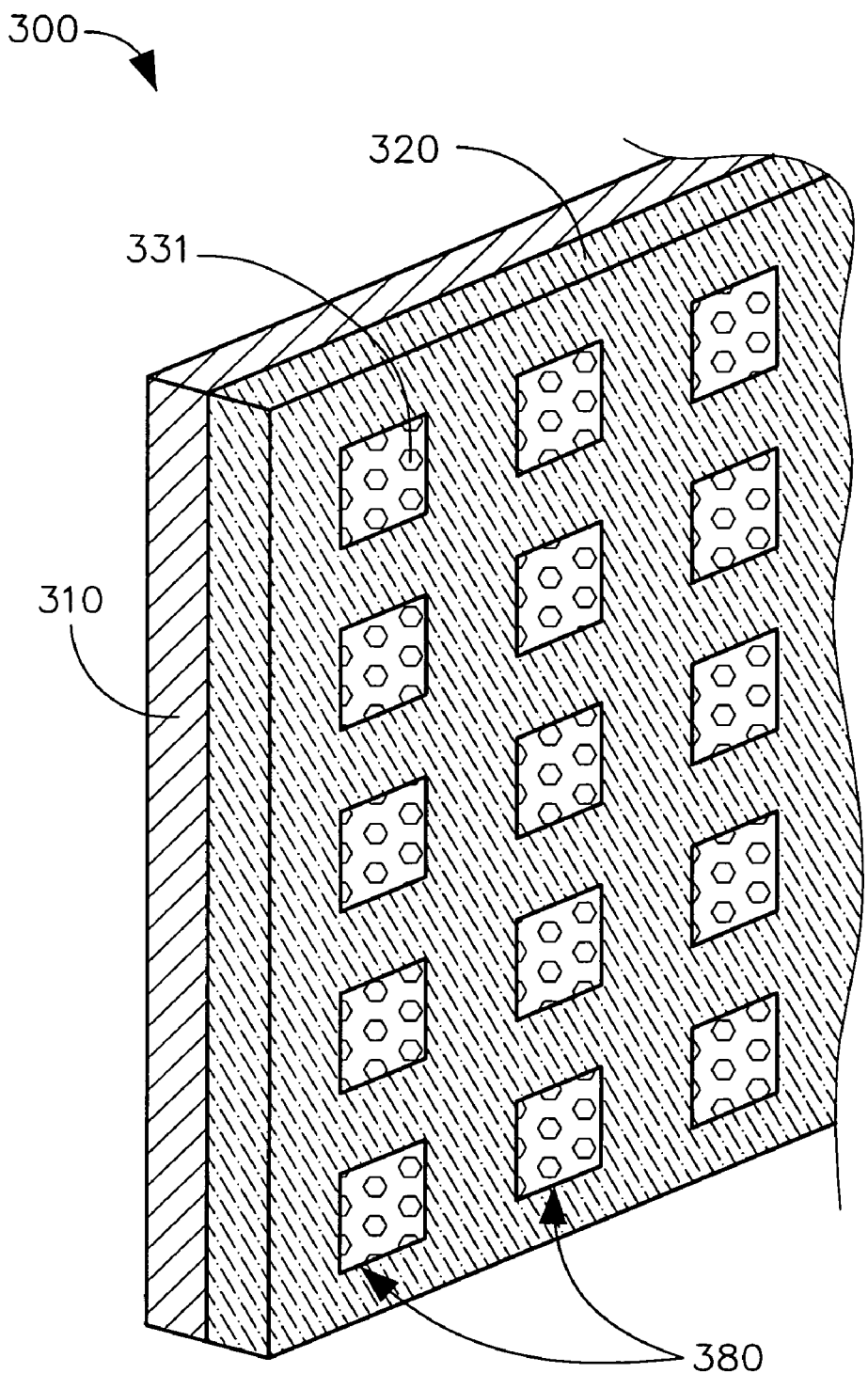
FIG. 4A is a c-c' sectional view of the embodiment of the projection screen in FIG. 3.

Refer to FIG. 4A for a c-c' sectional view of an embodiment of the projection screens 300, 301, and 302 in FIG. 3, FIG. 3A, and FIG. 3B. The light absorbing structure 320 is disposed on the reflection layer 310, and has a plurality of apertures 380. The light absorbing structure 320 is used to absorb the external miscellaneous light O for enhancing the image contrast, and a part of the reflection layer 310 is exposed via the apertures 380. Noticeably, the reflection layer 310 is suitable for reflecting projection light without being diffused, and has no light diffusion material and light diffusion structure so as to ensure reflecting the projection light R out of the projection screen 300, for instance, the emergent light paths R1, R2, and R3. The light diffusion layers 330 are filled in the apertures 380 of the light absorbing structure 320 by filling technology respectively, and contact the exposed part of the reflection layer 310. In other words, each of the light diffusion layers 330 is disposed in the corresponding aperture 380 of the light absorbing structure 320.

Figure 4B:
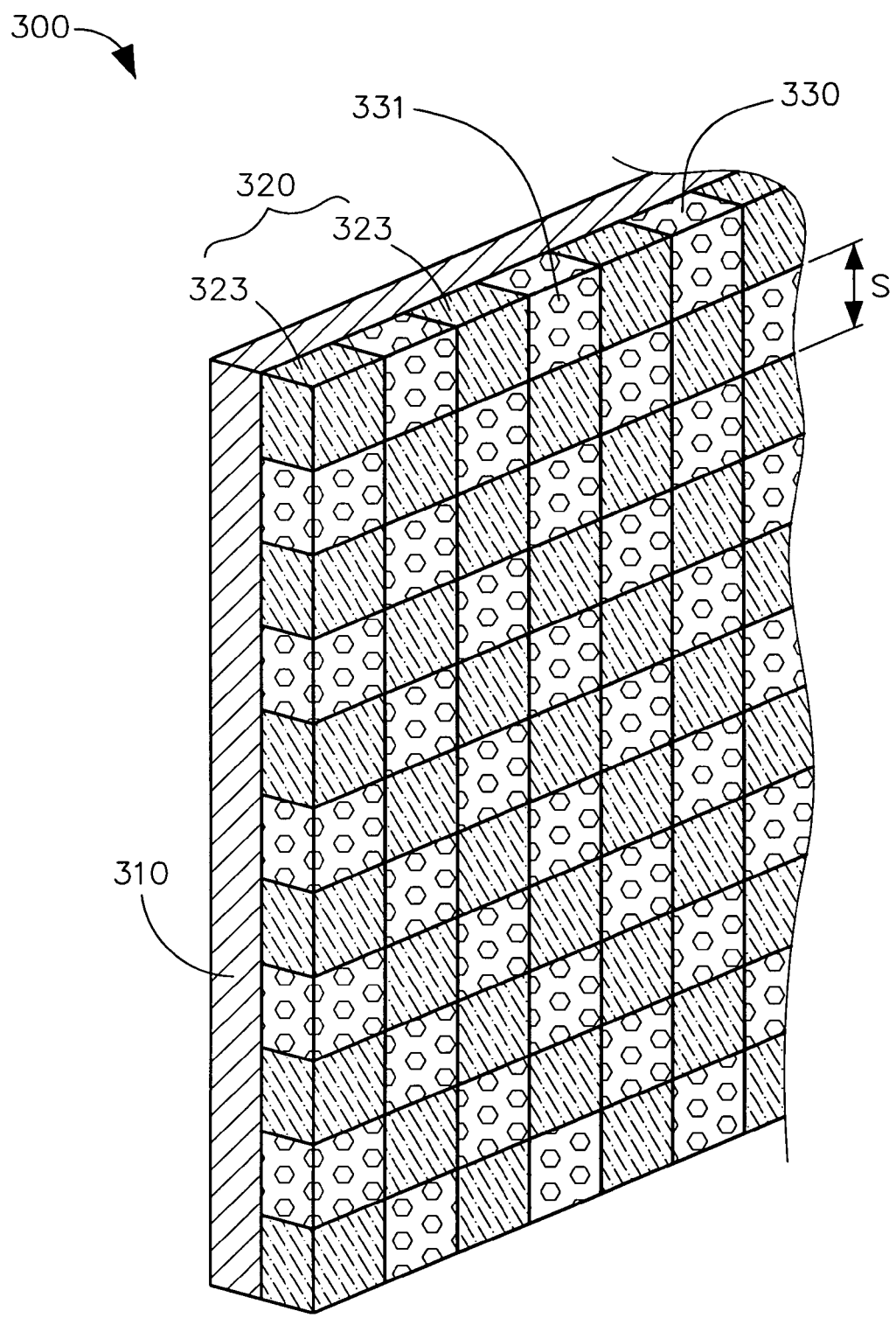
FIG. 4B is a c-c' sectional view of another embodiment of the projection screen in FIG. 3.

Refer to FIG. 4B for a c-c' sectional view of another embodiment of the projection screens 300, 301, and 302 in FIG. 3, FIG. 3A, and FIG. 3B. The light absorbing structure 320 has a plurality of light absorbing layers 323 disposed on the light reflection layer 310, and an interval S between every two opposite light absorbing layers 323. A part of the reflection layer 310 is exposed via the interval S. A plurality of the light diffusion layers 330 are disposed on the reflection layer 310, and the light diffusion layers 330 are filled in the intervals S respectively. Notably, the light diffusion layers 330 are disposed on the same level and on the reflection layer 310. Each of the light diffusion layers 330 connects adjacently to the corresponding light absorbing structure 320, and contacts the corresponding reflection layer 310 exposed via the corresponding aperture.

Moreover, the light absorbing layer 323 may be a column protruding out of the surface of the light diffusion layers 330, with a square section or a taper section.

As FIG. 3 shows, the light diffusion layers 330 may be poly-ester, light diffusion particles or their mixture, and has a first index of refraction. In an embodiment, a plurality of light diffusion particles 311 and poly-ester are mixed to form the light diffusion layers 330. When the projection light R is reflected by the reflection layer 310 and enters the light diffusion layers 330, the emergent angle and the path of the reflection light may be changed by the light diffusion particles 331 to obtain the light diffusion effects. For example, the reflection light emits along the emergent light paths R1, R2, and R3 to increase the distribution area of the reflection light so as to raise image viewing angle.

Figure 5:
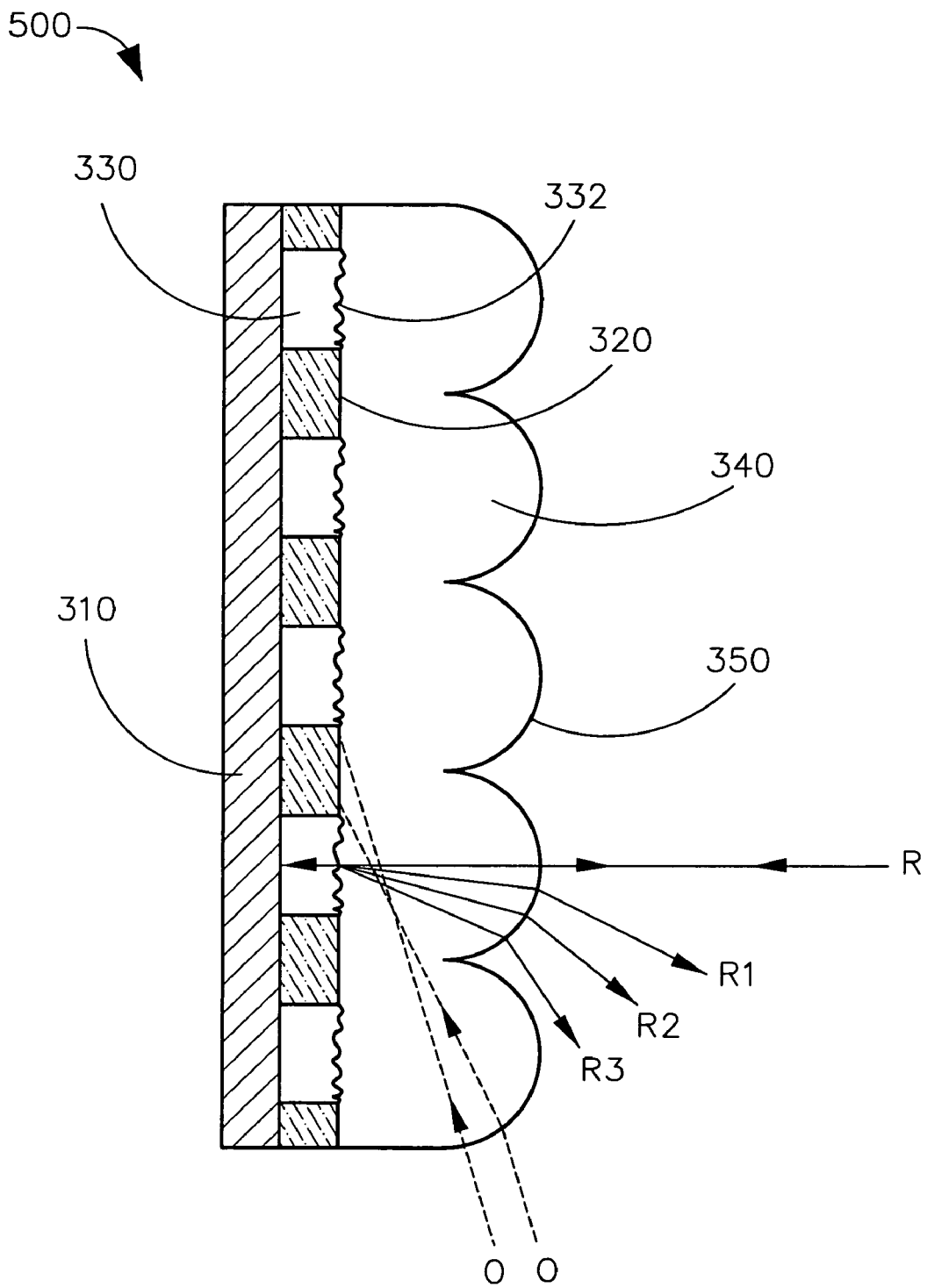
FIG. 5 is a schematic view of the fourth embodiment of the projection screen according to the present invention.

Refer to FIG. 5 for a schematic view showing the section of the fourth embodiment of the projection screen 500 according to the present invention. The surface of the light diffusion layers 330 is sandblasted to form a rough surface 332. After the projection light R is reflected to pass through the rough surface 332, the rough surface 332 diffuses the emergent light, such as along the emergent light paths R1, R2, and R3 so as to raise the image viewing angle.

Referring to FIG. 3, the lens structure 340 is disposed on the light absorbing structure 320 and the light diffusion layers 330. An light incidence side of the lens structure 340 faces the projector (not shown) and includes a plurality of convex lenses 350 corresponding with the light diffusion layers 330 respectively. Each of the convex lenses 350 is disposed right on the relative light diffusion layer 330. The lens structure 340 has a second index of infraction, and the second index of infraction of the lens structure 340 is smaller than the first index of infraction of the light diffusion layers 330. Thus, when the projection light enters the light diffusion layers 330 via the lens structure 340, the projection light may be refracted to focus in the center of the light diffusion layers 330 for avoiding the projection light which enters the light diffusion layers 330 emitting to the light absorbing structure 320 at two sides and being absorbed by the light absorbing structure 320, so that the gain of the projection screen 300 may be decreased.

In the present embodiment, the focus of each of the convex lenses 350 is located under the reflection layer 310, so that before being focused, the projection light R enters the light diffusion layer 330 to be diffused and then exits out of the projection screen 300. Moreover, after the projection light R is diffused by the light diffusion layer 330, the destructive interference in the emergent light paths R1, R2, and R3 may be avoided for achieving a better gain of the projection screen 300.

Figure 6:
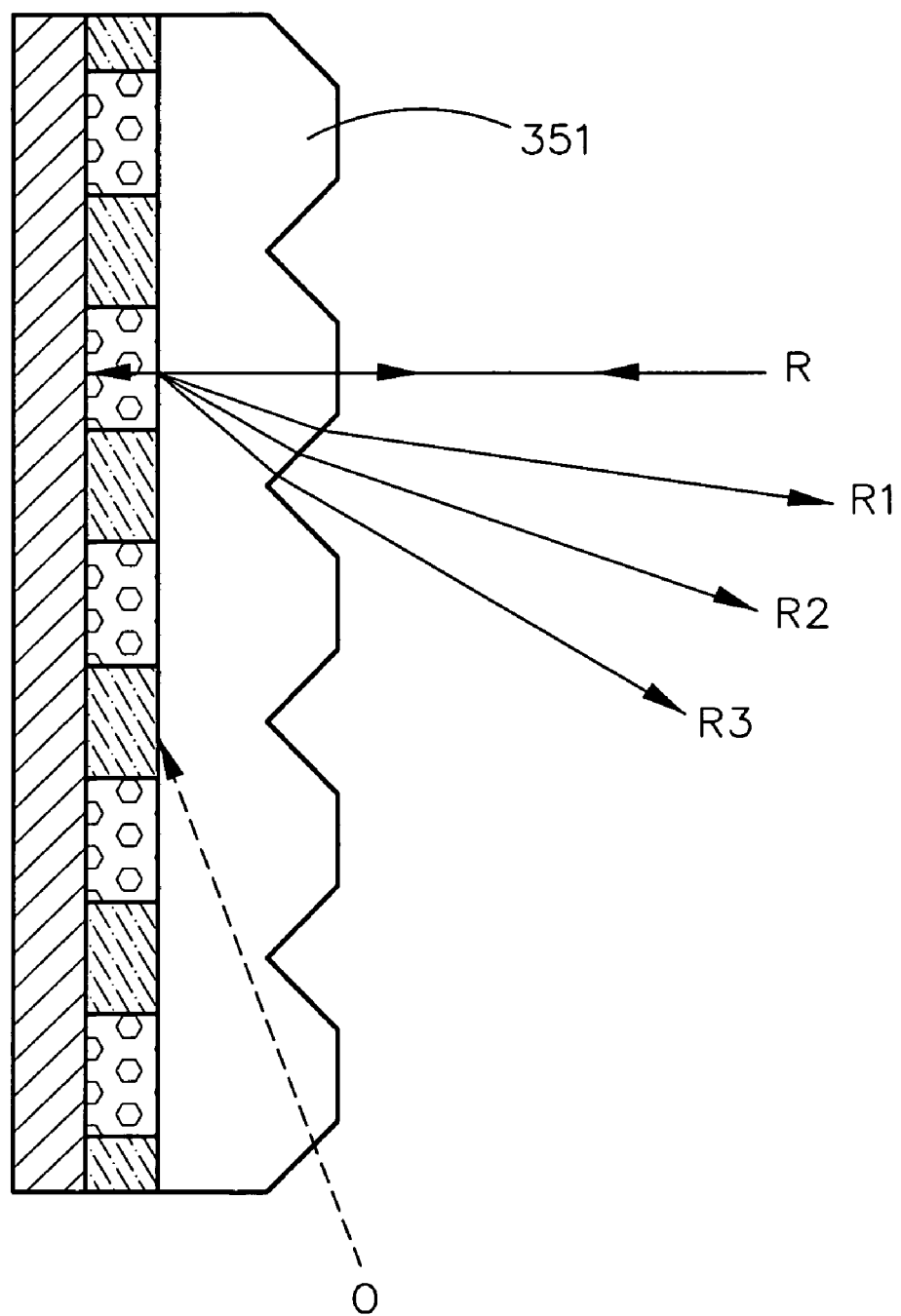
FIG. 6 is a schematic view of the fifth embodiment of the projection screen according to the present invention.
Figure 7A:
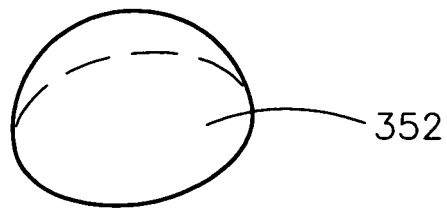
FIG. 7A-7D are three dimensional views of various kinds of convex lenses.
Figure 7B:
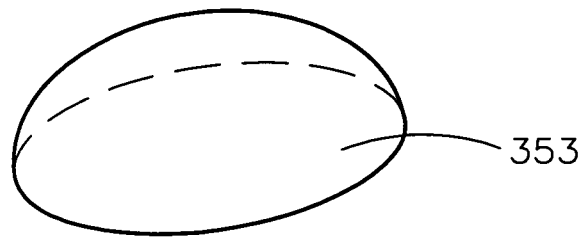
Figure 7C:
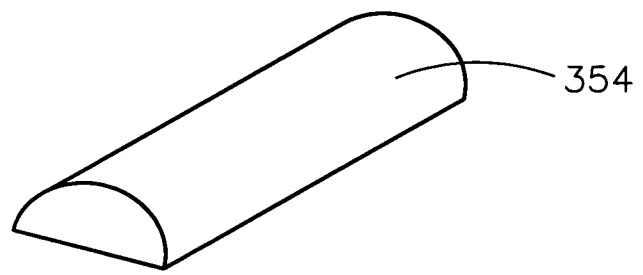
Figure 7D:
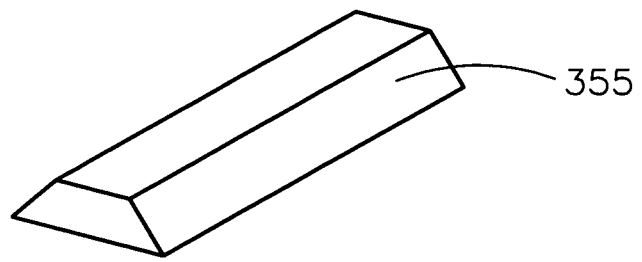

Referring to FIG. 6, the convex lens 350 of the projection screen 300 in FIG. 3 is replaced with the polyhedron lens 351. FIG. 7A to FIG. 7D are three dimensional views of various kinds of convex lenses 352, 353, 354, and 355. In an embodiment, the sorts of the above-mentioned convex lenses 350 may be a sphere lens 352, a paraboloid lens 353, a arc column lens 354, a polyhedron column lens 355, or combinations of above lenses.

Based on the concept of the present invention, other embodiments may be obtained by various combinations of the structure characters of the projection screens 300, 301, 302, and 500 in above embodiments. For example, the convex lens 350 of the projection screen 301 in FIG. 3A may be changed from the arc lens to the arc column lens 354 in FIG. 7C, the light diffusion layer 330 mixed with the light diffusion particles 331 in the projection screen 302 in FIG. 3B may be replaced by the sandblasted rough surface 332 in FIG. 5, or the light absorbing structure 320 of the projection screen 500 in FIG. 5 may be replaced with the protruding structure 322 in FIG. 3B, etc.

In summary, the embodiment or the embodiments may have at least one of the following advantages:

Firstly, the light absorbing structure may protrude out of the surface of the light diffusion layer to enhance the effect of absorbing external miscellaneous light and to increase the image contrast.

Secondly, by changing the lens structure, the focus of each of the convex lenses is located under the reflection layer. Because the convex lenses corresponds to the light diffusion layer respectively, the destructive interference generated by the projection light during light-emitting process may be avoided and obtain a better gain of the projection screen.

Thirdly, the light diffusion layer is disposed on the reflection layer to make the reflection light pass through the light diffusion layer so as to change the emergent angle and the path of the reflection light for diffusing light and increasing the image viewing angle.

The foregoing description of the present embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suitable for the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection screen, comprising:
a reflection layer;
a light absorbing structure, disposed on the reflection layer, having a plurality of apertures, a part of the reflection layer exposed via the apertures;
a plurality of light diffusion layers, having a first index of refraction, each of the light diffusion layers disposed in the corresponding aperture of the light absorbing structure and contacting the corresponding reflection layer exposed via the corresponding aperture; and
a lens structure, disposed on the light diffusion layers and the light absorbing structure, a light incidence side of the lens structure comprising a plurality of convex lenses corresponding with the light diffusion layers respectively, and the lens structure having a second index of refraction smaller than the first index of refraction of the light diffusion layers.

2. The projection screen of claim 1, wherein the reflection layer is adapted to reflect a light beam without being diffused.

3. The projection screen of claim 1, wherein each of the light diffusion layers has a sand blasting surface.

4. The projection screen of claim 1, wherein each of the light diffusion layers has a plurality of light diffusion particles.

5. The projection screen of claim 1, wherein the light absorbing structure has a plurality of protruding structures disposed on the surface of the light diffusion layers.

6. The projection screen of claim 5, wherein each of the protruding structures comprises a column with a square section or a taper section, and each of the protruding structures adjoins one of the apertures.

7. The projection screen of claim 1, wherein the focus of each of the convex lenses is located under the reflection layer.

8. The projection screen of claim 1, wherein the convex lenses are selected from the group consisting of a sphere lens, a paraboloid lens, a polyhedron lens, and a column lens.

9. The projection screen of claim 1, wherein each of the convex lenses is disposed right on the corresponding light diffusion layer.

10. The projection screen of claim 1, wherein each of the light diffusion layers has a sand blasting surface.

11. A projection screen, comprising:
a reflection layer;
a light absorbing structure, having a plurality of light absorbing layers disposed on the reflection layer, and having a interval between two opposite light absorbing layers, a part of the reflection layer exposed via the intervals;
a plurality of light diffusion layers, having a first index of refraction, disposed on the reflection layer, each of the light diffusion layer disposed in the corresponding interval and adjoining the corresponding light absorbing structure; and
a lens structure, disposed on the light diffusion layers and the light absorbing structure, a light incidence side of the lens structure comprising a plurality of convex lenses corresponding with the light diffusion layers respectively, and the lens structure having a second index of refraction smaller than the first index of refraction of the light diffusion layers.

12. The projection screen of claim 11, wherein the reflection layer is adapted to reflect a light beam without being diffused.

13. The projection screen of claim 11, wherein each of the light absorbing layers protrudes out of the surface of each of the light diffusion layers.

14. The projection screen of claim 13, wherein each of the light absorbing layers comprises a column with a square section or a taper section.

15. The projection screen of claim 11, wherein each of the diffusion layers has a plurality of light diffusion particles.

16. The projection screen of claim 11, wherein the focus of each of the convex lenses is located under the reflection layer.

17. The projection screen of claim 11, wherein the convex lenses are selected from the group consisting of a sphere lens, a paraboloid lens, a polyhedron lens, and a column lens.

18. The projection screen of claim 11, wherein each of the convex lenses is disposed right on the corresponding light diffusion layer.

\* \* \* \* \*